United States Patent [19]

Kato et al.

[11] Patent Number: 5,087,594

[45] Date of Patent: Feb. 11, 1992

[54] CERAMIC MATERIAL FOR INJECTION MOLDING AND METHOD OF INJECTION MOLDING USING THE SAME

[75] Inventors: Shigeki Kato, Nagoya; Katsuhiro Inoue, Ama, both of Japan

[73] Assignee: NGK Insulators, Ltd., Japan

[21] Appl. No.: 454,894

[22] Filed: Dec. 22, 1989

[30] Foreign Application Priority Data

Dec. 24, 1988 [JP] Japan .................. 63-326929

[51] Int. Cl.⁵ .................. C04B 35/58; C04B 35/48
[52] U.S. Cl. .................. 501/97; 501/94; 501/98; 501/103; 106/272; 264/319; 264/328.1; 425/543
[58] Field of Search .................. 501/97, 98, 103, 94; 106/272; 264/319, 328.1; 425/543; 524/80

[56] References Cited

U.S. PATENT DOCUMENTS

| | | | |
|---|---|---|---|
| 4,485,182 | 11/1984 | Enomoto et al. | 501/97 |
| 4,571,414 | 2/1986 | Renlund et al. | 501/98 |

FOREIGN PATENT DOCUMENTS

| | | | |
|---|---|---|---|
| 0135839 | 4/1985 | European Pat. Off. | 501/97 |
| 0233118 | 2/1986 | Fed. Rep. of Germany | 501/96 |
| 55-136177 | 10/1980 | Japan | 501/97 |
| 55-140764 | 11/1980 | Japan | 501/97 |
| 59-039775 | 3/1984 | Japan | 501/97 |
| 60-005065 | 1/1985 | Japan | 501/97 |
| 61-006172 | 1/1986 | Japan | 501/103 |
| 61-106464 | 5/1986 | Japan | 501/103 |

OTHER PUBLICATIONS

Derwent-Kurzreferat 83-823318 (JP 58-174444-A).
Chemical Abstract, vol. 106, 1987, p. 292, Ref. 142881u.
Chemical Abstract, vol. 107, 1987, p. 300, Ref. 241492v.

*Primary Examiner*—Mark L. Bell
*Assistant Examiner*—Anthony J. Green
*Attorney, Agent, or Firm*—Parkhurst, Wendel & Rossi

[57] ABSTRACT

A ceramic material for injection molding is provided which enables splendid molding property, superior degreasing property of the molded body, and high material efficiency. The ceramic material includes a composition of 40–60 vol % of a ceramic powder, and 52–40 vol % of organic binders, the organic binder includes 3–15 wt % of an organic binder of an average molecular weight of 10,000–50,000, and 85–97 wt % of at least one organic binder of an average molecular weight of 200–1,000. A method of producing ceramic molded bodies is provided which prolongs fluidity of the ceramic material in the die, enables complete filling of the ceramic material in the die, completely prevents molding defects and distortion of molded body, affords high productivity of ceramic molded bodies with improved material efficiency, and achieves full degreasing property of the molded body. The method uses the above described ceramic material, and the ceramic molding material is injection molded at an injection condition of 55°–95° C. of the ceramics molding material and 40°–52° C. of the die.

10 Claims, 3 Drawing Sheets

CERAMIC MATERIAL FOR INJECTION MOLDING AND METHOD OF INJECTION MOLDING USING THE SAME

BACKGROUND OF THE INVENTION

1. Field of the Invention

The present invention relates to a ceramic material for injection molding, and a method of injection molding using the material.

2. Related Art Statement

Heretofore, injection molding has been known as a method of producing ceramic molded bodies of relatively complicated configurations. In this method, a ceramic powder and an organic binder consisting of a resin like polyethylene, or polystyrene, etc., and a wax, are mixed, injected and filled in a die, and formed to obtain a shaped body. The shaped body is subsequently heated (degreased) to burn and remove the organic binder, and then fired to produce a sintered body.

In the injection molding method, usually a mixture of raw materials is heated to above a plasticizing temperature thereof, for example about 120°-160° C., injected and filled in a die of about 120°-160° C., cooled and solidified, and then removed from the die to obtain a shaped body.

However, in the usual injection molding method, the mixture of raw materials and the die have different temperatures at the time of injection molding, so that there are drawbacks in that the injected mixture loses its fluidity rapidly in the die to yield molding defects like reclining or recess at the molded surface due to molding of insufficient filling of the mixture, and strain in the molded body due to inhomogeneous filling of the mixture which causes cracks at the time of degreasing.

In order to solve the above drawbacks, the inventors researched and experimented and discovered to the present invention, which includes a method of injection molding which minimizes temperature difference between the molding material and injection die, and a molding material suitable for the injection molding.

SUMMARY OF THE INVENTION

An object of the present invention is to solve the above drawbacks.

Another object of the present invention is to provide a ceramic molding material for injection molding which has good molding properties and which can produce molded bodies of improved degreasing property with high material efficiency.

Still another object of the present invention is to provide a method of injection molding of a ceramic material with exceedingly improved molding properties, splendid material efficiency, and remarkable productivity.

Still a further object of the present invention is to minimize temperature difference between the molding material and the injection die to prolong the fluidity of the molding material in the die.

A further object of the present invention is to perform the filling of the molding material in the die sufficiently to obviate the strain of the molded body caused by inhomogeneous filling of the molding material.

The present invention is a ceramic material for injection molding comprising a composition of 48-60 vol % of a ceramic powder, and 52-40 vol % of organic binder, the organic binder consisting of 3-15 wt % of an organic binder of an average molecular weight of 10,000-50,000, and 85-97 wt % of at least one organic binder of an average molecular weight of 200-1,000.

The present invention is also a method of producing ceramic molded bodies, wherein a ceramic molding material for injection molding comprising a composition of 48-60 vol % of ceramic powder and 40-52 vol % of organic binder, the organic binder consisting of 3-15 wt % of an organic binder of an average molecular weight of 10,000-50,000, and 85-97 wt % of at least one organic binder of an average molecular weight of 200-1,000, is used, and the ceramic molding material is injection molded at an injection condition of 55°-95° C. of the ceramic molding material and 40°-52° C. of the die.

Preferably, the ceramic molding material has a composition of 48-60 vol %, particularly 52-58 vol %, of ceramics powder and 40-52 vol %, particularly 42-48 vol %, of organic binder, and the organic binder has a composition of 3-15 wt %, particularly 5-13 wt %, of an organic binder of an average molecular weight of 10,000-50,000, and 85-97 wt %, particularly 87-95 wt %, of at least one organic binder of an average molecular weight of 200-1,000.

If the ceramic powder is less than 48 vol %, the amount of the organic binders becomes large, so that the degreasing property of the molded body becomes bad. While, if it exceeds 60 vol %, the amount of the organic binder becomes small, so that the fluidity of the ceramic molding material becomes bad.

If the amount of the organic binder of an average molecular weight of 10,000-50,000 is less than 3 wt %, the molded body is weak in mechanical strength and liable to contain cracks when released from the die. While, if it exceeds 15 wt %, the fluidity of the ceramic molding material becomes bad, so that molding defects are likely to occur at the time of molding, and the degreasing property of the molded body is decreased.

Illustrative examples of the organic binder having an average molecular weight of 10,000-50,000 are polyethylene, polystyrene, polypropylene, atactic polypropylene, ethylene-vinyl acetate copolymer (EVA), ethylene-acrylate copolymer, acrylic resins, etc., but are not limited thereto. One or at least two of these binders are selected for use.

Also, the organic binders having an average molecular weight of 200-1,000 are not limited to specific ones, and various kinds of the organic binder, for example, waxes, such as, paraffin wax, microcrystalline wax, and synthetic wax, etc.; lubricants, such as oleic acid, stearic acid, diethylphthalate (DEP), oleyl alcohol, and silane compounds, etc.; and coupling agents; can be used. These materials are selected and used alone or in admixture of at least two.

In the method of injection molding of the ceramics material, injection molding should be effected at an injection condition of a ceramic temperature of 55°-95° C., preferably 60°-80° C., and a die temperature of 40°-52° C., preferably 43°-50° C. A temperature difference of 10° C. or more than 10° C. between the temperature of the molding material and the die is preferable, because it facilitates the releasing property of releasing the molded ceramics material from the die.

If the temperature of the ceramic molding material is less than 55° C., the ceramic molding material does not fluidize, so that the injection molding thereof can not be performed. While, if it exceeds 95° C., segregation of the ceramic powder and the organic binder takes place in the ceramic molding material or the viscosity of the ceramic molding material is decreased, so that a separated layer of the organic binder is liable to occur in the molded body or air foams are entrained in the molded body during the injection molding to result in a molded body having poor properties.

If the temperature of the die is less than 40° C., the ceramic molding material loses its fluidity rapidly in the die during the injection molding, so that a so-called "short shot" of the ceramic molding material is incurred and a desired shape of the molded body can not be afforded. While, if it exceeds 52° C., the molded body does not have a shape retaining property, so that cracks are formed in the molded body at the time of releasing it from the die.

As the ceramic materials, use is made of silicon nitride, partially stabilized zirconia, or sialon, etc., which are selected and used properly alone or in admixture depending on required properties of the product molded body.

BRIEF DESCRIPTION OF THE DRAWINGS

For a better understanding of the present invention, reference is made to the accompanying drawings, in which.

DESCRIPTION OF THE PREFERRED EMBODIMENTS

Figure 1:
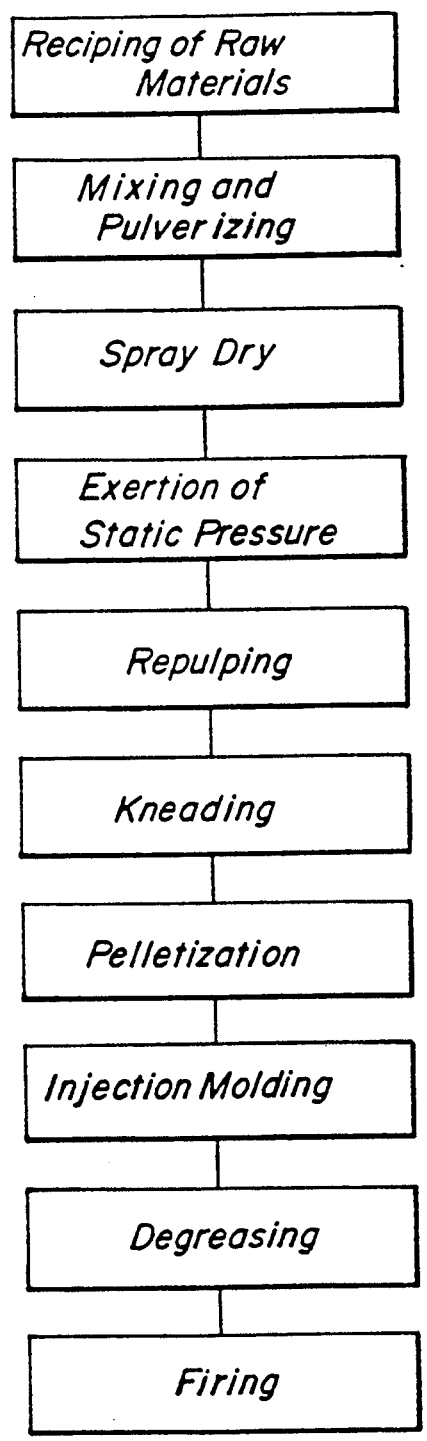
FIG. 1 is a flow chart showing an outline of the method of injection molding of a ceramic material of the present invention.

The method of injection molding of the ceramic molding material of the present invention will be explained with reference to the flow chart shown in the attached FIG. 1.

At first, the ceramic material is added and reciped with a desired amount of sintering aids, and then pulverized to form a mixture. If necessary, the mixture is spray dried to form granules, and the granules are optionally pressed by hydrostatic pressure to produce lumps or clods, and the lumps or granules are crushed or repulped to obtain desired particle sizes of a ceramics powder. The ceramic powder prepared in this way is added and kneaded with organic binder, extruded from an extruder to produce pellets, and the pellets are injection molded to obtain a molded body of a desired shape.

The resultant molded body is subsequently subjected to degreasing treatments, and then fired to produce a sintered ceramics body.

Hereinafter the present invention will be explained in more detail with reference to the following examples which, however, should not be construed by any means as limitations of the present invention. In the Examples all parts are shown by weight basis, unless otherwise specified.

EXAMPLE 1

100 parts of silicon nitride ($Si_3N_4$) are added with sintering aids of 2 parts of SrO, 3 parts of MgO, and 3 parts of $CeO_2$, and pulverized to obtain a mixture of an average particle diameter of 0.5 μm. Then, the mixture is spray dried to obtain granulates, and exerted by a hydrostatic pressure of 3 ton/cm² to form lumps, and the lumps are repulped to obtain a ceramic powder of an average particle diameter of 30 μm. The prepared ceramic powder is added with organic binder in the recipes as shown in the later described Table 1, extruded by an extruder to provide pellets, and injection molded under conditions as shown in Table 1 to obtain three kinds of molded bodies as described below:

(a) blocks of 30 mm square;

(b) blocks of 40 mm square; and (c) turbocharger rotor of an axis-blades integral type of blade diameter of 55 mm.

As the organic binder of an average molecular weight of 10,000–50,000, ethylene-vinyl acetate copolymer is used. As the organic binders of an average molecular weight of 200–1,000, paraffin wax, microcrystalline wax, or oleic acid are used. As comparative examples, polyethylene of an average molecular weight of 50,000–100,000 or polypropylene of an average molecular weight of 100,000–200,000 is used instead of the organic binder of an average molecular weight of 10,000–50,000, and polyethylene wax or low molecular polypropylene of an average molecular weight of 1,000–10,000 is used instead of the organic binder of an average molecular weight of 200–1,000.

The temperature of the ceramic molding material is determined by preliminarily measuring the temperature of the ceramic molding material immediately after injection thereof from the injection nozzle prior to the injection molding thereof to the die. The temperature of the die is determined by preliminarily measuring the surface temperature of the cavity portion of the die prior to the injection molding.

Gradient of the block and/or the die a the time of injection molding for facilitating the releasing of the block from the die is 2° for both blocks (a) and (b).

Next, the temperature of the thus obtained molded bodies are elevated to 400° C. at a temperature raising rate of 1°–3° C./hr, held at 400° C. for 5 hrs to effect degreasing, and examined in their degreased states. The results of the injection molding and degreasing of the molded bodies are shown in Table 1 and FIGS. 2 and 3.

Figure 2:
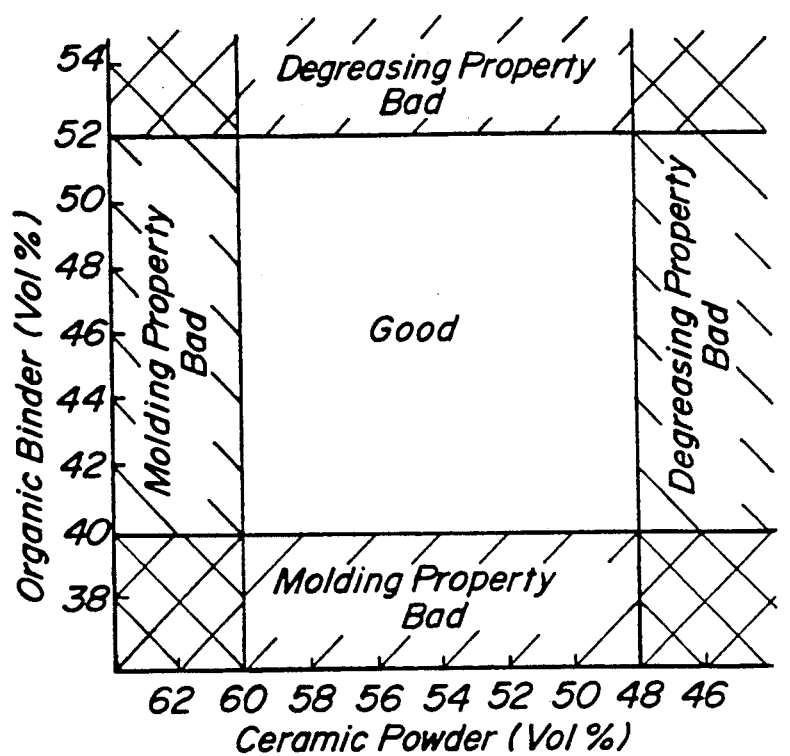
FIGS. 2-4 are graphs showing results of injection molding the ceramic molding material and results of degreasing of the injection molded boy respectively in the Examples.
Figure 3:
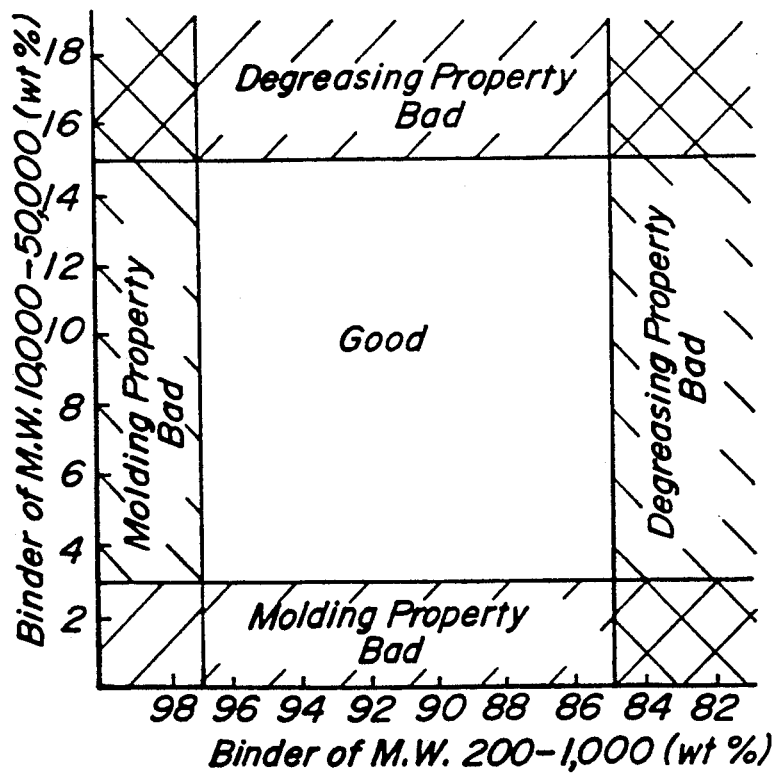

As seen clearly from Table 1 and FIGS. 2 and 3, the molding property of the molding material and the degreasing property of the molded body are noticeably improved, in the case when the molding material has a composition of 48–60 vol % of the ceramic powder, and 40–52 vol % of the organic binder, and the organic binder has a composition of 3–15 wt % of the organic binder of an average molecular weight of 10,000–50,000, and 85–97 wt % of the organic binder of an average molecular weight of 200–1,000.

On the other hand, all the molded bodies using organic binders which are outside the scope of the present invention have bad molding property and degreasing property, as seen in Comparative Example Nos. 13–20 of Table 1. Defects produced in the molded bodies are welding or cracks at the time of releasing thereof from the die, and defects produced in the degreased molded body are surface cracks.

When the composition of the organic binders lies within the scope of the present invention, paraffin wax, particularly in an amount of 60–90 wt %, is preferable among the organic binders having an average molecular weight of 200–1,000, because it gives splendid molding property or degreasing property.

EXAMPLE 2

The method of Example 1 is repeated using compositions and injection molding conditions of the molding materials as shown in the following Table 2.

Figure 4:
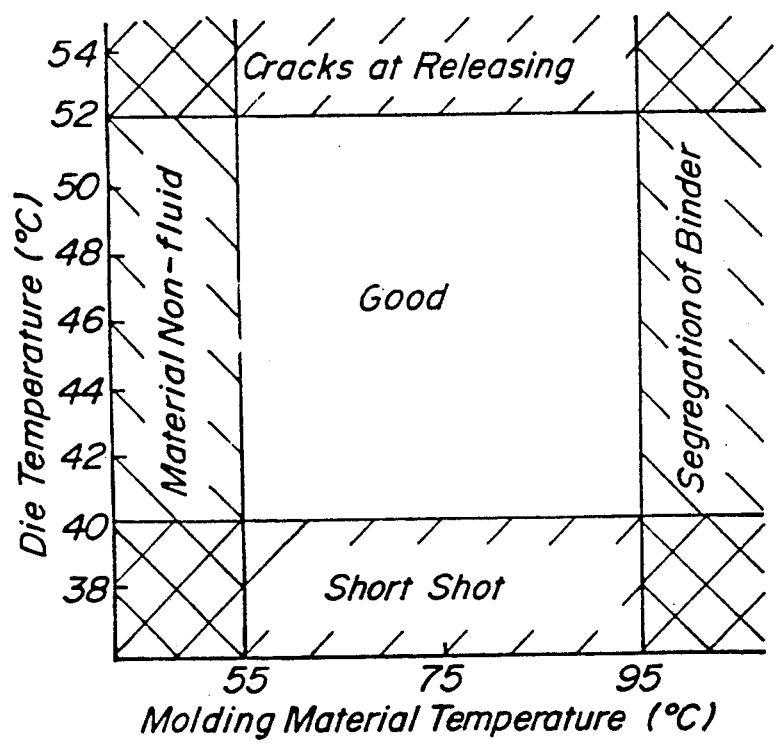

The results are shown in Table 2 and FIG. 4.

As seen clearly from Table 2 and FIG. 4, the molding property of the ceramic molding material is good when the molding material is at a temperature of 50°-95° C., and the die is at a temperature of 40°-52° C.

On the other hand, ceramic molding materials and molded bodies injection molded at molding conditions of beyond the scope of the present invention show bad molding property and degreasing property, as seen in Comparative Example Nos. 17-20.

In Tables 1 and 2, EVA has an average molecular weight of 20,000, and a softening point of 100° C.; PE has an average molecular weight of 70,000, and a softening point of 122° C.; PP has an average molecular weight of 190,000, and a softening point of 150° C.; PE wax has an average molecular weight of 2,000, and a softening point of 113° C.; PP has an average molecular weight of 4,000, and a softening point of 150° C.; P-wax has an average molecular weight of 400, and a softening point of 60° C.; MC wax has an average molecular weight of 530, and a softening point of 55° C.; and Oleic acid has a molecular weight of 282, and a softening point of 11° C.

TABLE 1(a)

| | | Vol ratio (%) | | Composition of organic binders (wt %) | | | | | | | |
|---|---|---|---|---|---|---|---|---|---|---|---|
| | | | | Molecular wieght 10,000-50,000 EVA | Molecular weight 50,000-100,000 PE | Molecular weight 100,000-200,000 PP | 1,000-10,000 | | 200-1,000 | | |
| Example No. | | Ceramic powders | Organic binder | | | | PE wax | Low molecular PP | P-wax | MC-wax | Oleic acid |
| Present invention | 1 | 51 | 49 | 3.0 | — | — | — | — | 62.0 | 27.0 | 8.0 |
| | 2 | 54 | 46 | 3.0 | — | — | — | — | 59.0 | 33.0 | 5.0 |
| | 3 | 55 | 45 | 3.0 | — | — | — | — | 78.0 | 10.0 | 9.0 |
| | 4 | 56 | 44 | 3.0 | — | — | — | — | 92.0 | — | 5.0 |
| | 5 | 58 | 42 | 3.0 | — | — | — | — | 90.0 | 2.0 | 5.0 |
| | 6 | 60 | 40 | 3.0 | — | — | — | — | 90.0 | 2.0 | 5.0 |
| | 7 | 54 | 46 | 5.0 | — | — | — | — | 79.0 | 8.0 | 8.0 |
| | 8 | 53 | 47 | 10.0 | — | — | — | — | 73.0 | 7.0 | 10.0 |
| | 9 | 52 | 48 | 13.0 | — | — | — | — | 76.0 | 5.0 | 6.0 |
| | 10 | 48 | 52 | 15.0 | — | — | — | — | 67.0 | 13.0 | 5.0 |
| | 11 | 50 | 50 | 15.0 | — | — | — | — | 67.0 | 13.0 | 5.0 |
| | 12 | 51 | 49 | 15.0 | — | — | — | — | 77.0 | 3.0 | 5.0 |
| Comparative Example | 13 | 56 | 44 | 1.0 | — | — | — | — | 80.0 | 10.0 | 9.0 |
| | 14 | 51 | 49 | 17.0 | — | — | — | — | 75.0 | 3.0 | 5.0 |
| | 15 | 47 | 53 | 10.0 | — | — | — | — | 73.0 | 7.0 | 10.0 |
| | 16 | 61 | 39 | 3.0 | — | — | — | — | 90.0 | 2.0 | 5.0 |
| | 17 | 53 | 47 | — | 10.0 | — | — | — | 73.0 | 7.0 | 10.0 |
| | 18 | 53 | 47 | — | — | 10.0 | — | — | 73.0 | 7.0 | 10.0 |
| | 19 | 53 | 47 | 10.0 | — | — | 73.0 | — | — | 7.0 | 10.0 |
| | 20 | 53 | 47 | 10.0 | — | — | — | 73.0 | — | 7.0 | 10.0 |

(Notes)
EVA: Ethylene/vinyl acetate copolymer,
PE: Polyethylene,
PP: Polypropylene,
PE wax: Polyethylene wax, Low molecular PP: Low molecular polypropylene,
P-wax: Paraffin wax,
MC-wax: Microcrystalline wax TABLE 1(b)

| | | Conditions of injection molding | | | Result of molding | | | Result of degreasing | | | |
|---|---|---|---|---|---|---|---|---|---|---|---|
| Example No. | | Material temperature (°C.) | Die temperature (°C.) | Injection pressure (kg/cm$^2$) | a | b | c | a | b | c | Evaluation |
| Present invention | 1 | 65 | 45 | 600 | ○ | ○ | ○ | ○ | ○ | ○ | good |
| | 2 | 65 | 45 | 600 | ○ | ○ | Δ | ○ | ○ | ○ | nearly good |
| | 3 | 65 | 45 | 600 | ○ | ○ | ○ | ○ | ○ | ○ | good |
| | 4 | 62 | 45 | 600 | ○ | ○ | Δ | ○ | ○ | ○ | nearly good |
| | 5 | 68 | 45 | 600 | ○ | ○ | ○ | ○ | ○ | ○ | good |
| | 6 | 70 | 45 | 600 | ○ | ○ | Δ | ○ | ○ | Δ | nearly good |
| | 7 | 67 | 45 | 600 | ○ | ○ | ○ | ○ | ○ | ○ | good |
| | 8 | 70 | 47 | 600 | ○ | ○ | ○ | ○ | ○ | ○ | good |
| | 9 | 75 | 47 | 600 | ○ | ○ | ○ | ○ | ○ | ○ | good |
| | 10 | 72 | 50 | 600 | ○ | ○ | Δ | ○ | ○ | Δ | nearly good |
| | 11 | 80 | 50 | 600 | ○ | ○ | ○ | ○ | ○ | Δ | nearly good |
| | 12 | 85 | 50 | 600 | ○ | ○ | Δ | ○ | ○ | Δ | nearly good |
| Comparative Example | 13 | 65 | 43 | 600 | ○ | X | Δ | ○ | ○ | — | bad |
| | 14 | 87 | 52 | 600 | ○ | ○ | Δ | Δ | X | X | bad |
| | 15 | 67 | 47 | 600 | ○ | ○ | Δ | Δ | X | X | bad |
| | 16 | 70 | 45 | 600 | Δ | X | X | Δ | X | X | bad |
| | 17 | 75 | 48 | 600 | Δ | Δ | Δ | Δ | X | X | bad |
| | 18 | 80 | 48 | 600 | Δ | Δ | X | Δ | X | — | bad |
| | 19 | 100 | 50 | 600 | Δ | X | X | X | X | — | bad |

TABLE 1(b)-continued

| | Conditions of injection molding | | | Result of molding | | | Result of degreasing | | | |
|---|---|---|---|---|---|---|---|---|---|---|
| Example No. | Material temperature (°C.) | Die temperature (°C.) | Injection pressure (kg/cm²) | a | b | c | a | b | c | Evaluation |
| 20 | 110 | 50 | 600 | Δ | X | X | X | X | — | bad |

(Note)
○: not having defect,
Δ: having defect and not having defect,
X: having defect TABLE 2(a)

| Ex-ample No. | Vol ratio (%) | | Composition of organic binders | | | | Conditions of injection molding | | | Result of molding | | | Result of degreasing | | | Evaluation |
|---|---|---|---|---|---|---|---|---|---|---|---|---|---|---|---|---|
| | Ceramic powders | Organic binder | EVA | P-wax | MC-wax | Oleic acid | Material temperature (°C.) | Die temperature (°C.) | Injection pressure (kg/cm²) | a | b | c | a | b | c | |
| Present invention | | | | | | | | | | | | | | | | |
| 1 | 55 | 45 | 3.0 | 78.0 | 10.0 | 9.0 | 55 | 40 | 600 | ○ | ○ | Δ | ○ | ○ | Δ | nearly good |
| 2 | 55 | 45 | 3.0 | 78.0 | 10.0 | 9.0 | 55 | 45 | 600 | ○ | ○ | Δ | ○ | ○ | Δ | nearly good |
| 3 | 54 | 46 | 5.0 | 79.0 | 8.0 | 8.0 | 60 | 43 | 600 | ○ | ○ | ○ | ○ | ○ | ○ | good |
| 4 | 54 | 46 | 5.0 | 79.0 | 8.0 | 8.0 | 62 | 47 | 600 | ○ | ○ | ○ | ○ | ○ | ○ | good |
| 5 | 54 | 46 | 5.0 | 79.0 | 8.0 | 8.0 | 62 | 50 | 600 | ○ | ○ | ○ | ○ | ○ | ○ | good |
| 6 | 54 | 46 | 10.0 | 73.0 | 7.0 | 10.0 | 62 | 52 | 600 | ○ | ○ | Δ | ○ | ○ | ○ | nearly good |
| 7 | 54 | 46 | 10.0 | 73.0 | 7.0 | 10.0 | 66 | 47 | 600 | ○ | ○ | ○ | ○ | ○ | ○ | good |
| 8 | 54 | 46 | 10.0 | 73.0 | 7.0 | 10.0 | 70 | 43 | 600 | ○ | ○ | ○ | ○ | ○ | ○ | good |
| 9 | 54 | 46 | 10.0 | 73.0 | 7.0 | 10.0 | 70 | 47 | 600 | ○ | ○ | ○ | ○ | ○ | ○ | good |
| 10 | 54 | 46 | 10.0 | 73.0 | 7.0 | 10.0 | 70 | 50 | 600 | ○ | ○ | ○ | ○ | ○ | Δ | good |
| 11 | 52 | 48 | 13.0 | 76.0 | 5.0 | 6.0 | 75 | 43 | 600 | ○ | ○ | ○ | ○ | ○ | ○ | good |
| 12 | 52 | 48 | 13.0 | 76.0 | 5.0 | 6.0 | 75 | 47 | 600 | ○ | ○ | ○ | ○ | ○ | ○ | good |
| 13 | 52 | 48 | 13.0 | 76.0 | 5.0 | 6.0 | 75 | 50 | 600 | ○ | ○ | ○ | ○ | ○ | ○ | good |
| 14 | 52 | 48 | 13.0 | 76.0 | 5.0 | 6.0 | 80 | 47 | 600 | ○ | ○ | ○ | ○ | ○ | ○ | good |
| 14 | 51 | 49 | 15.0 | 77.0 | 3.0 | 5.0 | 95 | 40 | 600 | ○ | ○ | Δ | ○ | ○ | Δ | nearly good |
| 16 | 51 | 49 | 15.0 | 77.0 | 3.0 | 5.0 | 95 | 52 | 600 | ○ | ○ | Δ | ○ | ○ | Δ | nearly good |

TABLE 2(b)

| Example No. | | Vol ratio (%) | | Composition of organic binders | | | | Conditions of injection molding | | | Result of molding | | | Result of degreasing | | | Evaluation |
|---|---|---|---|---|---|---|---|---|---|---|---|---|---|---|---|---|---|
| | | Ceramic powders | Organic binder | EVA | P-wax | MC-wax | Oleic acid | Material temperature (°C.) | Die temperature (°C.) | Injection pressure (kg/cm²) | a | b | c | a | b | c | |
| Compar- | 17 | 55 | 45 | 3.0 | 78.0 | 10.0 | 9.0 | 53 | 47 | 600 | X | X | X | — | — | — | bad |
| ative | 18 | 54 | 46 | 10.0 | 73.0 | 7.0 | 10.0 | 70 | 38 | 600 | Δ | Δ | X | X | X | — | bad |
| Example | 19 | 54 | 46 | 10.0 | 73.0 | 7.0 | 10.0 | 72 | 54 | 600 | Δ | X | X | Δ | X | X | bad |
| | 20 | 51 | 49 | 15.0 | 77.0 | 3.0 | 5.0 | 97 | 47 | 600 | Δ | X | X | X | X | X | bad |

(Notes)
EVA: Ethylene/vinyl acetate copolymer,
P-wax: Paraffin wax
MC-wax: Microcrystalline wax
○: not having defect
Δ: having defect and not having defect
X: having defect As explained in detail in the foregoings, the following excellent effects are achieved by the present invention.

The material for injection molding of the present invention defines the composition to the specific range, so that the molding property thereof and the degreasing property of the molded body are improved noticeably, and the molded body can be produced easily and quickly with high productivity and highly improved material efficiency.

The method of injection molding the ceramics molding material of the present invention defines the temperatures of the molding material and the die to specific ranges and minimizes differences of the temperatures, so that the fluidity of the molding material in the die can be prolonged to enable the filling of the molding material into the die sufficiently well. Therefore, the molding defects such as welding at the time of injection molding of the ceramic molding material can be prevented, strain or distortion of the molded body due to inhomogeneous filling of the molding material can be obviated, and the degreasing property of the molded body can be improved remarkably. Accordingly, the present invention is eminently useful in the field of the industry.

Although the present invention has been explained with specific examples and numerical values, it is of course apparent to those skilled in the art that various changes and modifications thereof are possible without departing from the broad spirit and aspect of the present invention as defined in the appended claims.

What is claimed is:

1. A ceramic material for injection molding comprising a composition of 48–60 vol % of ceramic powder, and 52–40 vol % of organic binder, said organic binder consisting of 3-15 wt % of an organic binder of an average molecular weight of 10,000 -50,000, and 85-97 wt % of at least one organic binder of an average molecular weight of 200-1,000;

wherein said ceramic material is injection molded in a molding die at an injection condition of 55°-95° C. of said ceramic material and 40°-52° C. of said die.

2. The ceramic material of claim 1, wherein said ceramic powder comprises at least one material selected from the group consisting of silicon nitride, zirconia, and sialon.

3. The ceramic material of claim 1, wherein said organic binder having an average molecular weight of 10,000-50,000 comprises at least one material selected from the group consisting of polyethylene, polystyrene, polypropylene, atactic polypropylene, ethylene-vinyl acetate copolymer (EVA), ethylene-acrylate copolymer, and acrylic resins.

4. The ceramic material of claim 1, wherein said organic binder having an average molecular weight of 200-1,000 comprises at least one material selected from the group consisting of paraffin wax, microcrystalline wax, synthetic wax, oleic acid, stearic acid, diethylphthalate (DEP), oleyl alcohol, silane compounds and coupling agents.

5. The ceramic material of claim 1, wherein said ceramic powder is silicon nitride, said organic binder having an average molecular weight of 10,000-50,000 is ethylene-vinyl acetate copolymer (EVA), and said organic binder having an average molecular weight of 200-1,000 is a mixture of paraffin wax, microcrystalline wax and oleic acid.

6. A method of producing ceramic molded bodies, comprising:

forming a ceramic molding material for injection molding comprising a composition of 48-60 vol % of ceramic powder and 40-52 vol % of organic binder, said organic binder consisting of 3-15 wt % of an organic binder of an average molecular weight of 10,000-50,000, and 85-97 wt % of at least one organic binder of an average molecular weight of 200-1,000; and injection molding said ceramic molding material in a molding die at an injection condition of 55°-95° C. of said ceramic molding material and 40°-52° C. of said die.

7. The method of claim 6, wherein said ceramic powder comprises at least one material selected from the group consisting of silicon nitride, zirconia, and sialon.

8. The method of claim 6, wherein said organic binder having an average molecular weight of 10,000-50,000 comprises at least one material selected from the group consisting of polyethylene, polystyrene, polypropylene, atactic polypropylene, ethylene-vinyl acetate copolymer (EVA), ethylene-acrylate copolymer, and acrylic resins.

9. The method of claim 6, wherein said organic binder having an average molecular weight of 200-1,000 comprises at least one material selected from the group consisting of paraffin wax, microcrystalline wax, synthetic wax, oleic acid, stearic acid, diethylphthalate (DEP), oleyl alcohol, silane compounds and coupling agents.

10. The method of claim 6, wherein said ceramic powder is silicon nitride, said organic binder having an average molecular weight of 10,000-50,000 is ethylene-vinyl acetate copolymer (EVA), and said organic binder having an average molecular weight of 200-1,000 is a mixture of paraffin wax, microcrystalline wax and oleic acid.

* * * * *